United States Patent
Vogel et al.

(10) Patent No.: US 12,528,582 B2
(45) Date of Patent: *Jan. 20, 2026

(54) MODULAR LOAD CARRYING APPARATUS WITH INTERCHANGEABLE PLATFORMS

(71) Applicant: AIRBUS HELICOPTERS DEUTSCHLAND GMBH, Donauworth (DE)

(72) Inventors: Dominik Vogel, Langweid (DE); Alexandru Dinca, Donauworth (DE)

(73) Assignee: AIRBUS HELICOPTERS DEUTSCHLAND GMBH, Donauworth (DE)

( * ) Notice: Subject to any disclaimer, the term of this patent is extended or adjusted under 35 U.S.C. 154(b) by 1020 days.

This patent is subject to a terminal disclaimer.

(21) Appl. No.: 17/666,178

(22) Filed: Feb. 7, 2022

(65) Prior Publication Data
US 2022/0388659 A1 Dec. 8, 2022

(30) Foreign Application Priority Data
Jun. 8, 2021 (EP) .................................... 21400011

(51) Int. Cl.
*B64D 1/22* (2006.01)
*A62B 1/02* (2006.01)
(Continued)

(52) U.S. Cl.
CPC ................. *B64D 1/22* (2013.01); *A62B 1/02* (2013.01); *B64D 1/08* (2013.01); *B66C 1/16* (2013.01); *B64C 2211/00* (2013.01)

(58) Field of Classification Search
CPC ....................................................... B64D 1/08
See application file for complete search history.

(56) References Cited

U.S. PATENT DOCUMENTS

| 3,444,569 A | 5/1969 | Greenberg et al. |
| 3,467,346 A | 9/1969 | Carson |

(Continued)

FOREIGN PATENT DOCUMENTS

| EP | 1100720 A1 | 5/2001 |
| EP | 1646562 A1 | 4/2006 |

(Continued)

OTHER PUBLICATIONS

Kuzmin—RU-2563291-C1 + machine translation (Year: 2015).*

(Continued)

*Primary Examiner* — Juan G Flores
(74) *Attorney, Agent, or Firm* — BROOKS KUSHMAN P.C.

(57) ABSTRACT

A modular load carrying apparatus for a rotary wing aircraft and to a method of operating a modular load carrying apparatus. The modular load carrying apparatus may include a tube, first and second caps that are located inside the tube at first and second axial ends, and at least first and second removable platforms that are interchangeably installable on the tube. The second cap comprises a protrusion that protrudes from the axial end, and each one of the at least first and second removable platforms is adapted for being slidable over the first axial end of the tube and restrained by the second cap at the second axial end of the tube.

20 Claims, 9 Drawing Sheets

(51) Int. Cl.
  *B64D 1/08* (2006.01)
  *B66C 1/16* (2006.01)

(56) References Cited

U.S. PATENT DOCUMENTS

| | | |
|---|---|---|
| 3,476,339 A | 11/1969 | Pugh |
| 5,836,548 A | 11/1998 | Dietz et al. |
| 6,189,834 B1 | 2/2001 | Dietz et al. |
| 6,598,831 B1 * | 7/2003 | Tardy .................. A62B 99/00 |
| | | 441/83 |
| 11,787,531 B2 * | 10/2023 | Vogel ..................... B64D 1/08 |
| | | 244/118.2 |
| 2005/0023853 A1 * | 2/2005 | Liberato ................. B66C 1/127 |
| | | 294/77 |
| 2005/0250396 A1 * | 11/2005 | Hayles ..................... B63C 9/26 |
| | | 441/83 |
| 2006/0249330 A1 | 11/2006 | Tardy |
| 2016/0332843 A1 * | 11/2016 | Schafer .................... B66C 1/34 |

FOREIGN PATENT DOCUMENTS

| | | |
|---|---|---|
| WO | 0007877 A1 | 2/2000 |
| WO | 2005005253 A1 | 1/2005 |
| WO | 2019091669 A1 | 5/2019 |

OTHER PUBLICATIONS

European Search Report for European Application No. EP 21400011.9, Completed by the European Patent Office, Dated Nov. 11, 2021, 7 pages.

\* cited by examiner

MODULAR LOAD CARRYING APPARATUS WITH INTERCHANGEABLE PLATFORMS

CROSS-REFERENCE TO RELATED APPLICATIONS

This application claims priority to European patent application No. EP 21400011.9 filed on Jun. 8, 2021, the disclosure of which is incorporated in its entirety by reference herein.

TECHNICAL FIELD

The present embodiments relate to a modular load carrying apparatus and, more particularly, to a modular load carrying apparatus for a rotary wing aircraft. The present embodiments further relate to a method of operating a modular load carrying apparatus.

BACKGROUND

Aircrafts and, more particularly, rotary wing aircrafts such as e.g., helicopters are commonly used to perform aerial transportation and delivery tasks, including passenger transport, disaster relief, or carrying all kind of external loads. By way of example, rotary wing aircrafts are used to transport and deliver loads to mountainous regions in general and, more specifically, to mountainous regions where no roads exist or where roads cannot be used for transportation and delivery, e.g., due to extreme weather conditions in winter and so on.

Furthermore, rotary wing aircrafts are used for transportation and delivery of external loads such as passengers and equipment in the military sector or for rescue missions. In order to enable a rotary wing aircraft for transportation of an external load, the rotary wing aircraft is usually equipped with a hoist or lift mechanism.

Conventionally, such a hoist or lift mechanism has a boom that is secured to the fuselage of the aircraft with an external system. The hoist may include a winch mechanism that is fixed to the boom and a rope or cable attached to the winch mechanism so as to be unwound from or wound into the winch mechanism to respectively descend or ascend.

In many rotary wing aircrafts, the hoist mechanism is located above an access opening provided in the fuselage. This access opening allows people or objects to enter and exit the fuselage. Depending on the requirements of the mission and on the architecture of these rotary wing aircrafts, the opening access may be a side door, a rear door, a movable panel, or the like. Alternatively, a cargo hook arrangement may be installed underneath the rotary wing aircraft, and the opening access may be a floor trap.

Generally, a load carrying apparatus is secured to the rope or cable and suspended from the rotary wing aircraft by means of the rope or cable. Thus, people and/or objects can be transported by the rotary wing aircraft while being carried by the load carrying apparatus.

Document WO 2019/091669 A1 describes a pod for transporting people between a barge and an oil platform, comprising a central pole and a plurality of arms, one end of each arm being mounted in an articulated manner on the central pole between a storage position in which each arm extends substantially parallel to the central pole, and a use position in which each arm extends substantially orthogonal to the central pole so as to form a support base onto which people can climb in a standing position, the central pole further comprising, at the head of same, a peripheral gripping member suitable for being gripped by the people during the journey.

Document US 2005/0250396 A1 describes a compact rescue lift device adapted to be deployed from an elevated location, having a central spine with upper and lower portions, where the upper portion of the spine includes a means for coupling the device to a structure and the lower portion includes a plurality of seating surfaces which include both supporting and retaining portions, with the device also including a plurality of hand grips, where the device is adapted to carry multiple victims at a time.

Document EP 1 646 562 A1 (US 2006/0249330 A1) describes a pod comprising a central pole having a support section which bears the ends of pivot-mounted arms. When retracted against the pole, opposing free sections of the arms are held in place by a removable locking device comprising an axially-mobile crown element which locks the arms in a radial manner. The aforementioned crown element is held in the locked position by means of a hysteresis effect. In this way, with the release of a compressed spring, the crown element can only be moved backwards out of the hold when the spring is additionally compressed by an external force, such as to release a mobile end stop element which impedes the action of the spring, and the backstop element is maintained in delicate equilibrium by the crown element.

Document EP 1 100 720 A1 (U.S. Pat. No. 6,598,831 B1) describes a device suspended to a carrier for rescuing people or equipment comprising a link between the carrier and a pod capable of being folded and unfolded formed by a frame associated with a flexible support. The frame comprises, fixed to the link, a central mast connected to mobile means bearing the flexible support, for folding and unfolding the mobile means and the flexible support about the central mast.

Document U.S. Pat. No. 3,476,339 A describes a device for lifting an individual from an area enshrouded with foliage, comprising: an upper inverted cup-shaped casing, a lower cup-shaped casing, collapsed telescoping tubular members joining said casings, a plurality of elongated sheet material elements pivotally mounted at their upper ends on the upper casing surrounding said tubular members with lower ends, of said elements extending within the upper portion of said lower casing, releasable means including a detent maintaining said tubular members in said collapsed position and the casings in positions retaining said elements within the cross-sectional areas of the casings whereby the device in a compact condition may move by gravity downwardly through foliage, said tubular members being extensible upon release of said detent whereby the casings may be moved away from each other, a seat member shiftable to a position substantially at right angles to said tubular members, and means for moving the sheet material elements to extended positions forming a canopy over said seat member to deflect foliage from an individual supported on said sheet member.

Document U.S. Pat. No. 3,467,346 A describes an air-ground rescue device for use with a cable suspended from a hovering aircraft, said device comprising seat defining means carried at the lower end of the cable, a protective shield assembly removably mounted to the cable above said seat defining means, said shield assembly including a cap having a laterally open side slot for receiving the suspended cable, at least two panels hingedly connected to said cap for movement toward and away from stowed positions wherein their corresponding side edges are arranged contiguous to one another.

Document U.S. Pat. No. 3,444,569 A describes an air-sea rescue device for use with a cable suspended from a hovering aircraft, said device comprising a shank portion having an upper end adapted for connection to a cable as aforesaid, and also having a lower end, at least one seat pivotally connected to said lower end for movement between a stowed position alongside said shank portion and a deployed position wherein said seat extends laterally outwardly at substantially 90 degrees with respect to said shank portion, a floatation collar for said shank portion to float the device when immersed in water, strap means associated with said shank upper end portion for securing a person to be rescued on said deployed seat, means for stowing said strap means to said shank upper end portion, said floatation collar being annular in cross section and extending from the lower end of said shank portion to a point spaced below the upper end thereof to permit ready removal of said stowed strap means without interfering with said collar.

Documents U.S. Pat. Nos. 6,189,834 B1 and 5,836,548 A were cited.

However, all prior art documents lack a platform that is interchangeable between a seat-type and a net-type. Furthermore, any platform with foldable arms or seats uses straps or similar means that secure the foldable arms or seats in the deployed position. Moreover, all seat-type platforms lack means for preventing the arms or seats from rotating back from the unfolded position to a folded position.

SUMMARY

Based on the limitations and drawbacks of the prior art, an objective is to provide a modular load carrying apparatus for carrying a load with a rotary wing aircraft. The modular load carrying apparatus should have interchangeable platforms. These platforms should be lightweight, easy to install and to remove, and be foldable. Furthermore, the platforms should avoid the use of straps with which any equipment could become entangled.

This objective is solved by a modular load carrying apparatus comprising the features of claim 1. More specifically, a modular load carrying apparatus for a rotary wing aircraft may comprise a tube that has a first predetermined outer diameter and first and second axial ends; a first cap that is located inside the tube at the first axial end and adapted for being connected with the rotary wing aircraft; a second cap that is located inside the tube at the second axial end and comprises a protrusion that protrudes from the second axial end and has a second predetermined outer diameter that is greater than the first predetermined outer diameter; and at least first and second removable platforms that are interchangeably installable on the tube, wherein each one of the at least first and second platforms has a first predetermined inner diameter that is greater than the first predetermined outer diameter and smaller than the second predetermined outer diameter such that each one of the at least first and second removable platforms is adapted for being slidable over the first axial end of the tube and restrained by the second axial end of the tube.

The inventive modular load carrying apparatus with interchangeable platforms complies with the latest amendments of the Federal Acquisition Regulation (FAR) requirements and military standards.

The whole weight of the net-type and seat-type platforms is very low because just the net assembly and the seat assembly are exchanged and all the other parts of the modular load carrying apparatus such as, for example, the tube and the docking ring can be used for both configurations.

The operational benefit of the modular load carrying apparatus with interchangeable platforms is significant. As an example, several people can be brought inside a rotary wing aircraft such as a helicopter (e.g., with the seat-type platform) at the same time. As another example, several people and equipment or cargo can be transported outside a helicopter (e.g., with the net-type platform).

The modular load carrying apparatus with the net-type platform is adapted to the operational size of a special forces team in terms of volume or weight. In contrast thereto, conventional products are usually oversized.

Due to the large diameter of the tube, the required floatability of the modular load carrying apparatus on water may be achieved without additional floats. Placing a load carrying rod inside the tube may decouple the tension from bending loads and reduce the forces on the pipe.

Contrary to conventional load carrying apparatuses, no connecting or suspension ropes are attached between the tube and the carrier beams of the platforms. Instead, the forces and moments are transferred from the carrier beams directly into the carrier star. As a result, tripping hazards are eliminated and the segmentation of the areas is avoided, which may enable the faster execution of missions.

The modular load carrying apparatus provides for redundant securing means. In fact, transported people and/or equipment may be secured to the tube and to the docking ring, which leads to an increase in safety.

The modular load carrying apparatus may quickly be changed from a seat-type platform to a net-type platform and vice versa. A single person without tools may perform this change in configuration.

The carrier beams of the net-type platform provide stable support for sitting and/or standing compared to state-of-the-art products, where small tubes are installed and standing or sitting is only possible on the net.

The modular load carrying apparatus may be used for airborne external transport of people and cargo on rotary wing aircrafts such as helicopters. Depending on the planned mission, the desired platform type (e.g., a seat-type or net-type platform) may be mounted to the modular load carrying apparatus in a short time.

Integrated safety lugs on a docking ring may be used to secure people and/or cargo. A carrier arm of the seat-type or net-type platforms can be fixed in an unfolded position with a carrier locking device. Due to the carrier locking devices, the respective platforms may be able to stand safely on the ground without tipping over.

According to one aspect, only one of the at least first and second removable platforms is installable on the tube at a given time.

According to one aspect, the at least first and second removable platforms further comprise a seat-type platform with at least three seats.

According to one aspect, the at least first and second removable platforms further comprise a net-type platform with at least six carrier beams and nets between the at least six carrier beams.

According to one aspect, the modular load carrying apparatus further comprises removable upholstery that is removably installed to cover the outside of the tube.

According to one aspect, the modular load carrying apparatus further comprises platform fasteners that are adapted for securing each one of the at least first and second removable platforms to the tube and to the second cap.

According to one aspect, the modular load carrying apparatus further comprises a removable cover that has a second predetermined inner diameter that is greater than the first predetermined outer diameter and that is adapted for being slidable over the first axial end of the tube.

According to one aspect, the removable cover further comprises a plurality of safety lugs that are adapted for receiving means that secure a load on the at least first and second removable platforms.

According to one aspect, the modular load carrying apparatus further comprises cover fasteners that are adapted for securing the removable cover to the tube and to the first cap.

Furthermore, a method of operating a modular load carrying apparatus, the modular load carrying apparatus comprising platform fasteners, a tube that has a first predetermined outer diameter and first and second axial ends, a first cap that is located inside the tube at the first axial end, a second cap that is located inside the tube at the second axial end and comprises a protrusion that protrudes from the second axial end and has a second predetermined outer diameter that is greater than the first predetermined outer diameter, and at least first and second removable platforms, wherein each one of the at least first and second platforms has a first predetermined inner diameter that is greater than the first predetermined outer diameter and smaller than the second predetermined outer diameter, comprises selecting a platform among the at least first and second removable platforms; sliding the selected platform over the first axial end of the tube until the selected platform reaches the protrusion that protrudes from the second axial end of the tube; and using the platform fasteners to attach the selected platform to the tube and to the second cap.

According to one aspect, the modular load carrying apparatus further comprises removable upholstery, and the method further comprises sliding the removable upholstery over the first axial end of the tube until the removable upholstery reaches the selected platform such that the removable upholstery covers the outside of the tube.

According to one aspect, the modular load carrying apparatus further comprises cover fasteners and a removable cover that has a second predetermined inner diameter that is greater than the first predetermined outer diameter, and the method further comprises installing the removable cover at the first axial end of the tube; and using the cover fasteners to attach the removable cover to the tube and to the first cap.

According to one aspect, the method further comprises removing the cover fasteners to detach the removable cover from the tube and the first cap; and removing the removable cover from the first axial end of the tube.

According to one aspect, the modular load carrying apparatus further comprises removable upholstery that covers the outside of the tube, and the method further comprises removing the removable upholstery from the outside of the tube by sliding the removable upholstery over the first axial end of the tube.

According to one aspect, the method further comprises removing the platform fasteners to detach the selected platform from the tube and the second cap; and removing the selected platform from the modular load carrying apparatus by sliding the selected platform from the second axial end of the tube over the first axial end of the tube.

BRIEF DESCRIPTION OF THE DRAWINGS

Embodiments are outlined by way of example in the following description with reference to the attached drawings. In these attached drawings, identical or identically functioning components and elements are labeled with identical reference numbers and characters and are, consequently, only described once in the following description.

DETAILED DESCRIPTION

Figure 1A:
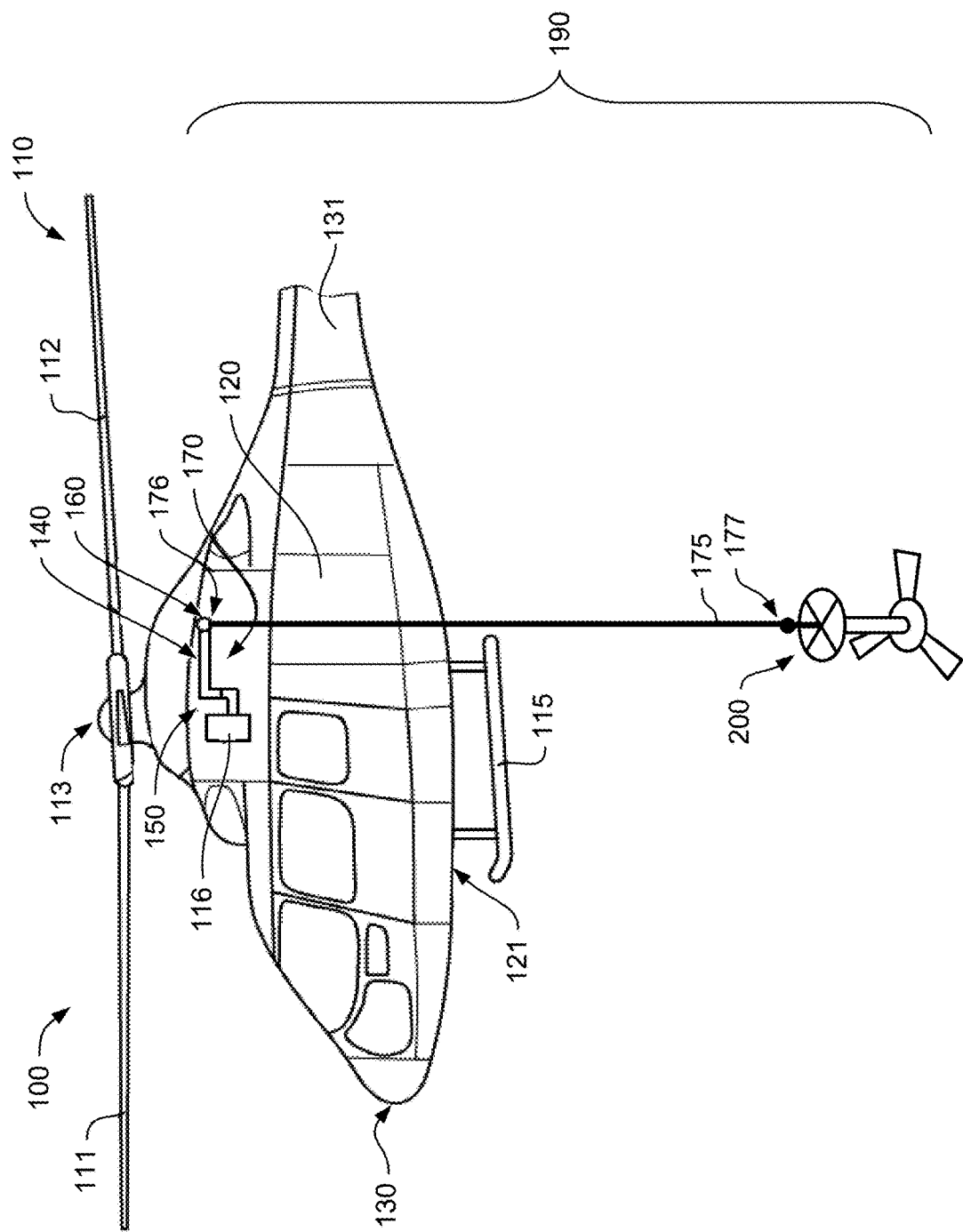
FIG. 1A is a diagram of an illustrative rotary wing aircraft with a modular load carrying apparatus that is attached to a hoist mechanism located above an access opening in the fuselage in accordance with some embodiments.
Figure 1B:
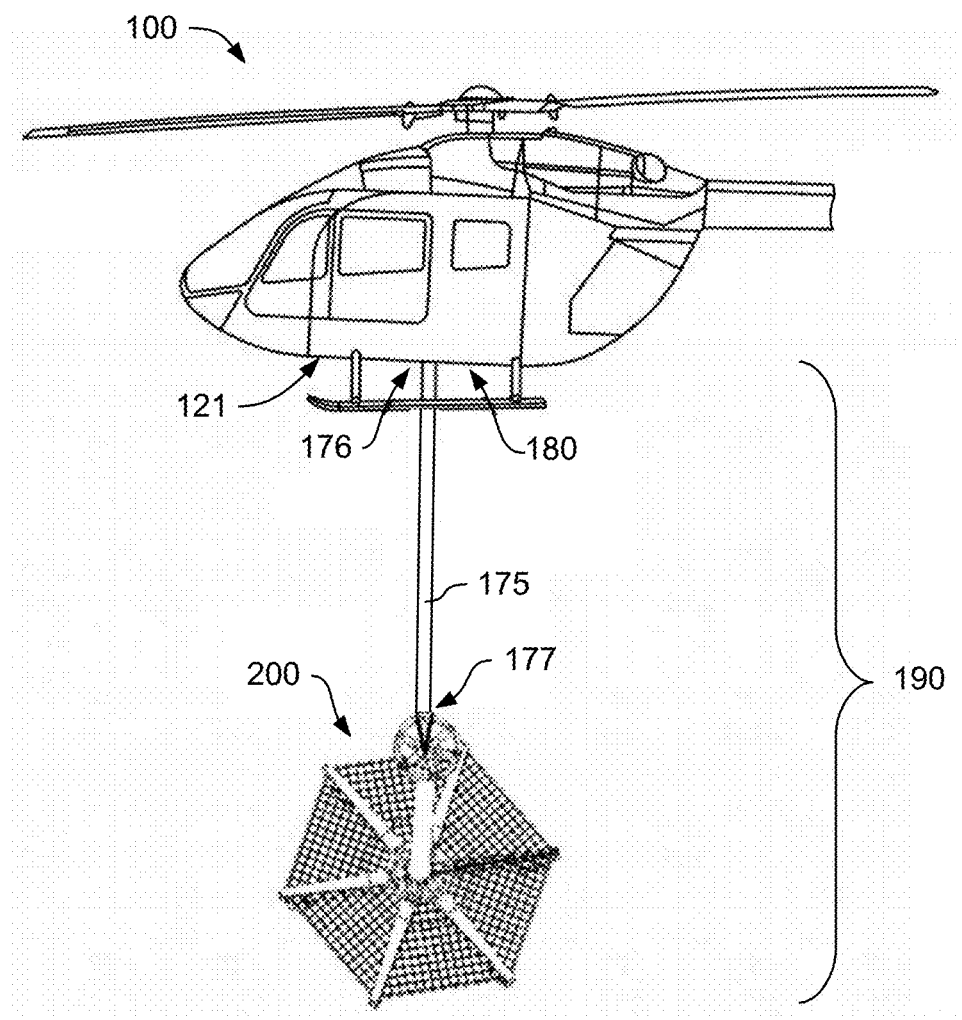
FIG. 1B is a diagram of an illustrative rotary wing aircraft with a modular load carrying apparatus that is attached to a cargo hook arrangement located at the underside of the fuselage in accordance with some embodiments.

Exemplary embodiments may be included in any rotary wing aircraft that is adapted for vertical take-off and landing. FIG. 1A and FIG. 1B show an example of a rotary wing aircraft 100. The rotary wing aircraft may be a multicopter, a drone, or any other rotorcraft such as tiltable-wing, fixed-wing, or wingless aircraft. Aircraft 100 is exemplarily illustrated as a helicopter. Thus, for purposes of simplicity and clarity, aircraft 100 is hereinafter referred to as "helicopter" 100.

As shown in FIG. 1A, the helicopter 100 is exemplarily embodied with a fuselage 120 and at least one multi-blade main rotor 110 for providing lift and forward or backward thrust during operation.

The at least one multi-blade main rotor 110 illustratively comprises a plurality of rotor blades 111, 112. The rotor blades 111, 112 are mounted at an associated rotor head 113 to a rotor shaft, which rotates in operation of the helicopter 100 around the rotor shaft.

Illustratively, the fuselage 120 may comprise a fuselage underside 121 that is illustratively connected to a landing gear 115. The landing gear 115 is exemplarily embodied as a skid-type landing gear.

The fuselage 120 may define a nose region 130 that is arranged in front of the fuselage 120. The fuselage 120 also defines a tail boom 131, which is cut away and not shown in greater detail, for simplicity and clarity of the drawings.

If desired, the helicopter 100 may provide equipment 160 such as an external load device (e.g., a hoist 170) that is secured to the fuselage 120 with a component 140. The component may be attached to a motor 116 via a power transmission system 150. The motor 116 may illustratively be arranged under the rotor head 113 and provide a rotational movement to the power transmission system 150.

Power transmission system 150 may transform the rotational movement of the motor 116 into a circular movement of the component 140. An outward circular movement of the component 140 (i.e., a circular movement of component 140 that moves equipment 160 away from helicopter 100) may deploy the equipment 160, whereas an inward circular movement of the component 140 (i.e., a circular movement of component 140 that moves equipment 160 closer to helicopter 100) may retrieve the equipment 160.

Helicopter 100 may include a load carrying assembly 190 for carrying a load. The load carrying assembly 190 may include a cargo cable 175 and a load engaging system 200. Illustratively, the cargo cable 175 may have a first end 176 that is attachable to the hoist 170 and a second end 177 that is attached to the modular load carrying apparatus 200. If desired, the hoist 170 may deploy and retrieve the cargo cable 175.

Illustratively, modular load carrying apparatus 200 of FIGS. 2A to 4C may implement the load engaging system 200 of FIG. 1A that is attached to the second end 177 of the cargo cable 175.

FIG. 1B is a diagram of an illustrative rotary wing aircraft 100 with a load carrying assembly 190 that is attached to a cargo hook arrangement 180 located at the fuselage underside 121. Illustratively, cargo hook arrangement 180 may be removably installed in the subfloor region of rotary wing aircraft 100 between a floor structure and a bottom shell.

By way of example, cargo hook arrangement 180 is mounted between two longerons, and longerons are connected to floor structure and bottom shell. If desired, cargo hook arrangement 180 may be mounted between two transversal frame components instead.

A first end 176 of cargo cable 175 may be attachable to the cargo hook arrangement 180. For example, cargo hook arrangement 180 may include a winch and the first end 176 of cargo cable 175 may be attachable to the winch. When the first end of 176 of cargo cable 175 is attached to the winch, the winch may deploy cargo cable 175.

A second end 177 of cargo cable 175 may be attached to modular load carrying apparatus 200. Illustratively, modular load carrying apparatus 200 of FIGS. 2A to 4C may implement the load engaging system 200 of FIG. 1B that is attached to second end 177 of cargo cable 175.

Figure 2A:
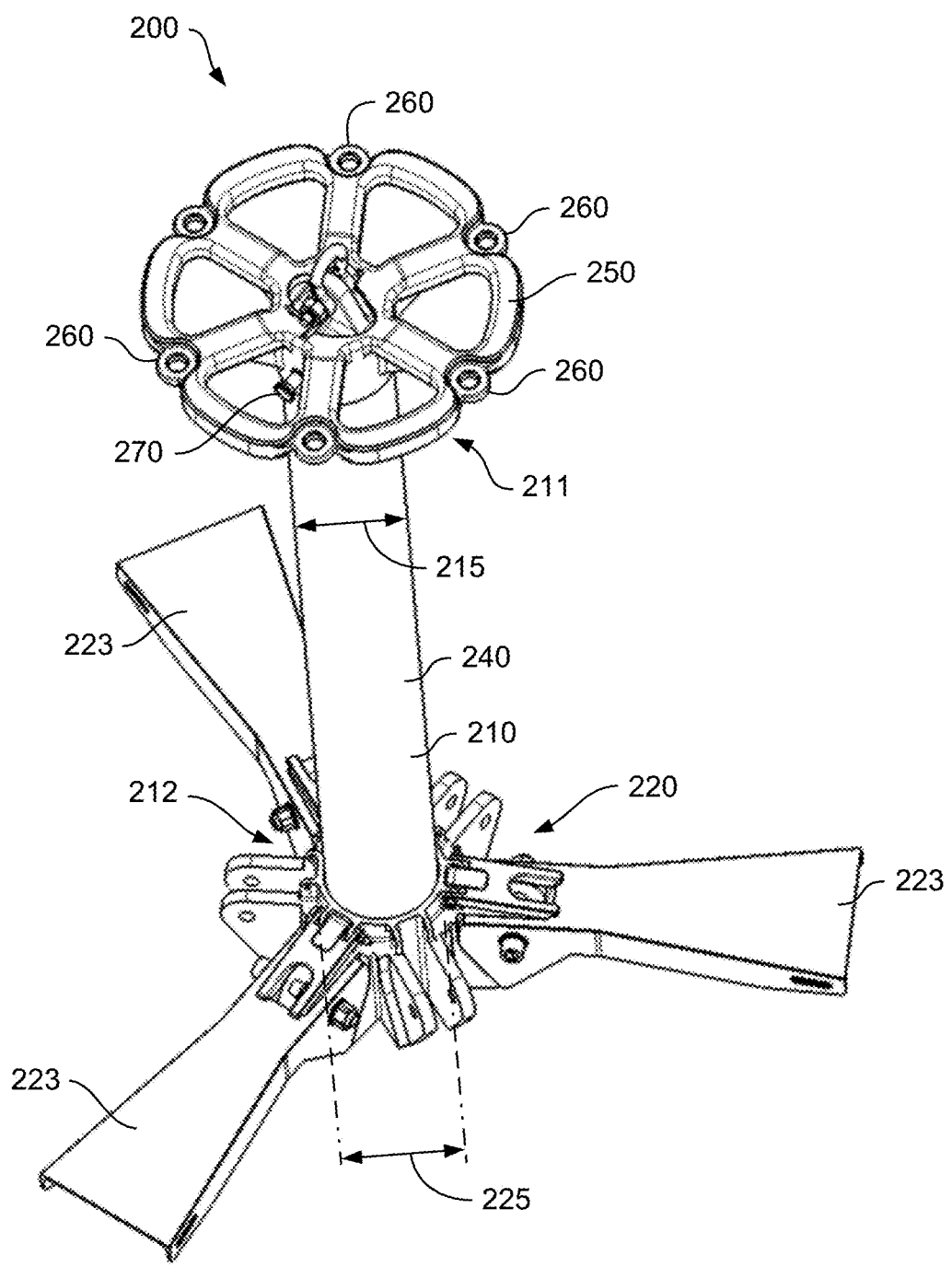
FIG. 2A is a diagram of an illustrative modular load carrying apparatus with a seat-type platform seen from above in accordance with some embodiments.

FIG. 2A is a diagram of an illustrative modular load carrying apparatus 200 with a removable seat-type platform 220 seen from above (i.e., as seen from the rotary wing aircraft 100 of FIG. 1A or FIG. 1B when the modular load carrying apparatus 200 is suspended from the rotary wing aircraft 100). The modular load carrying apparatus 200 may be used with the hoist 170 of FIG. 1A or with the cargo hook arrangement 180 of FIG. 1B.

Illustratively, the modular load carrying apparatus 200 may include a tube 210. The tube 210 may have a predetermined outer diameter 215 and first and second axial ends 211, 212. If desired, removable upholstery 240 may be removably installed to cover the outside of the tube 210. For example, the removable upholstery 240 may have the shape of a tube, and the removable upholstery 240 may be slid over the first axial end 211 of the tube 210 to cover the outside of the tube 210.

By way of example, the modular load carrying apparatus 200 may further have first and second caps. The first cap may be located inside the tube 210 at the first axial end 211 and adapted for being connected with the rotary wing aircraft. For example, the first cap may provide an eyelet, and a shackle may attach the eyelet with a cargo cable (e.g., cargo cable 175 of FIG. 1A or FIG. 1B).

The second cap may be located inside the tube 210 at the second axial end 212 and is described in more detail with reference to FIGS. 4A and 4C.

The modular load carrying apparatus 200 may include at least two removable platforms. The at least two removable platforms may be interchangeably installable on the tube 210.

Each one of the two platforms may have a predetermined inner diameter 225 that is greater than the predetermined outer diameter 215 of the tube 210. Thus, each one of the two platforms may be adapted for being slidable over the first axial end 211 of the tube 210.

However, only one of the at least two removable platforms may be installed on the tube 210 at a given time. As shown in FIG. 2A, the one of the at least two removable platforms that is installed on the tube 210 is a seat-type platform 220.

The seat-type platform 220 may include at least three seats 223. Illustratively, each one of the at least three seats 223 is attached to a carrier star. The carrier star shown in FIG. 2A may receive up to six seats 223. However, a carrier star that is able to receive more than six seats 223 may be used, if desired.

Preferably, the seats 223 are evenly distributed around the tube 210. As an example, three seats 223 may be installed with an angle of 120° between each other. As another example, four seats 223 may be installed with an angle of 90° between each other on a suitable carrier star. As yet another example, six seats 223 may be installed with an angle of 60° between each other.

Illustratively, the modular load carrying apparatus 200 may include a removable cover 250. The removable cover 250 may be adapted for being slidable over the first axial end 211 of the tube 210. Thus, the removable cover 250 may have a predetermined inner diameter that is greater than the predetermined outer diameter 215 of the tube 210.

By way of example, the removable cover 250 may include a plurality of safety lugs 260. The plurality of safety lugs 260 may be adapted for receiving means that secure a load on the seat-type platform 220. For example, a person sitting on a seat 223 may be attached to one or more of the safety lugs 260 by means of personal protective equipment.

As an example, a person sitting on a seat 223 may be attached with a harness, a safety line, and a snap hook or spring hook to one of the safety lugs 260. If desired, additional safety lugs may be provided on the upholstery 240 to ensure a redundant securing of each person.

Illustratively, the removable cover 250 may be secured to the tube 210 and/or to the first cap. For example, cover fasteners 270 may be adapted for securing the removable cover 250 to the tube 210 and to the first cap.

If desired, the cover fasteners 270 may include safety bolts, quick release pins, or any other fasteners that may be removed and installed without a tool. Preferably, at least two cover fasteners 270 and not more than four cover fasteners secure the removable cover 250 to the tube 210 and to the first cap.

Figure 2B:
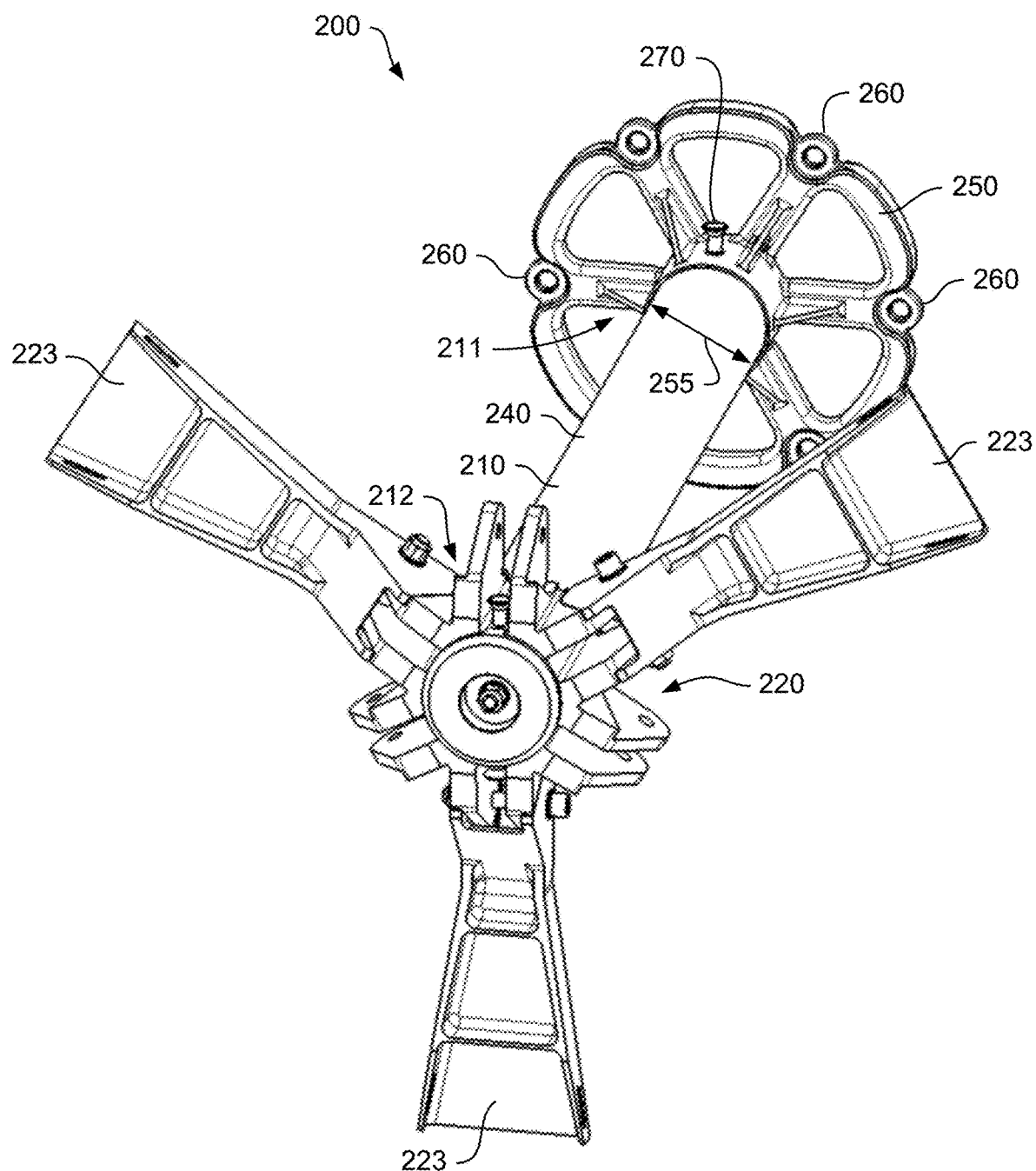
FIG. 2B is a diagram of the illustrative modular load carrying apparatus of FIG. 2A seen from below in accordance with some embodiments.

FIG. 2B is a diagram of the illustrative modular load carrying apparatus of FIG. 2A seen from below (i.e., as seen from the ground when the rotary wing aircraft 100 of FIG. 1A or FIG. 1B with the suspended modular load carrying apparatus 200 is hovering over the point of view).

As shown in FIG. 2B, the removable cover 250 may have a predetermined inner diameter 255 that is greater than the predetermined outer diameter of the tube 210. Thus, the removable cover 250 may be adapted for being slidable over the first axial end 211 of the tube 210.

Figure 3:
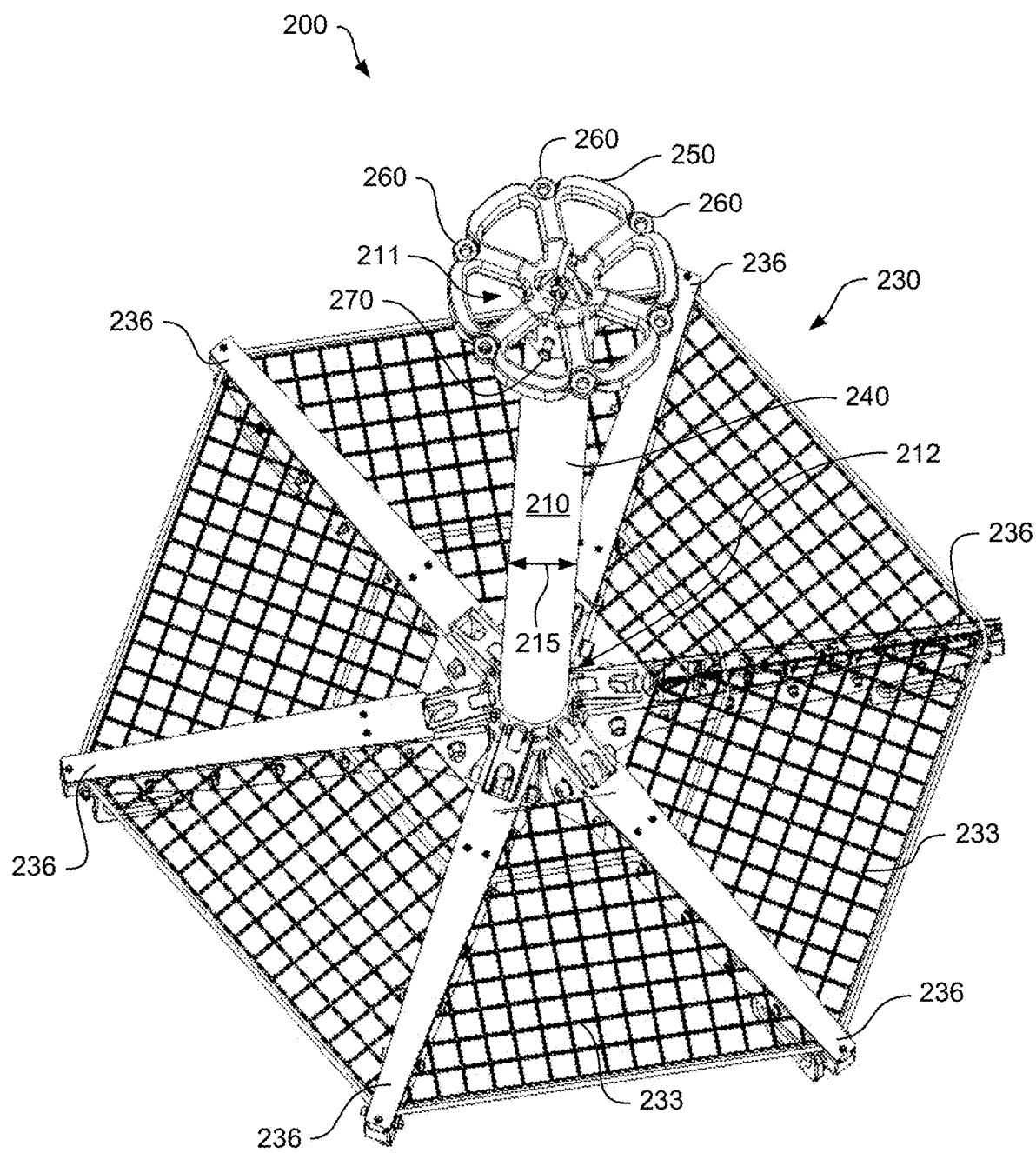
FIG. 3 is a diagram of an illustrative modular load carrying apparatus with a net-type platform in accordance with some embodiments.

FIG. 3 is a diagram of an illustrative modular load carrying apparatus 200 with a removable net-type platform 230. The modular load carrying apparatus 200 may be used with the hoist 170 of FIG. 1A or with the cargo hook arrangement 180 of FIG. 1B.

Illustratively, the modular load carrying apparatus 200 may include a tube 210. The tube 210 may have a predetermined outer diameter 215 and first and second axial ends 211, 212. If desired, removable upholstery 240 may be removably installed to cover the outside of the tube 210.

By way of example, the modular load carrying apparatus 200 may further have first and second caps. The first cap may be located inside the tube 210 at the first axial end 211 and adapted for being connected with the rotary wing aircraft. For example, the first cap may provide an eyelet, and a shackle may attach the eyelet with a cargo cable (e.g., cargo cable 175 of FIG. 1A or FIG. 1B).

The second cap may be located inside the tube 210 at the second axial end 212 and is described in more detail with reference to FIGS. 4A and 4C.

The modular load carrying apparatus 200 may include at least two removable platforms that are interchangeably installable on the tube 210. However, only one of the at least two removable platforms may be installed on the tube 210 at a given time. As shown in FIG. 3, the one of the at least two removable platforms that is installed on the tube 210 is a net-type platform 230.

The net-type platform 230 may include at least six carrier beams 236. Illustratively, each one of the at least six carrier beams 236 is attached to a carrier star. The carrier star shown in FIG. 3 may receive up to six carrier beams 236. However, a carrier star that is able to receive more than six carrier beams 236 may be used, if desired.

Preferably, the carrier beams 236 are evenly distributed around the tube 210. For example, six carrier beams 236 may be installed with an angle of 60° between each other.

By way of example, each one of the at least six carrier beams 236 may be foldable. In the folded position, the carrier beams 236 may be secured by a fastener that prevents the carrier beams 236 from returning from the folded position to an unfolded position.

For example, a fastener with a quick release buckle such as a side release buckle, a push button release buckle, an end button release buckle, or another specialty release buckle may secure a carrier beam 236 to the tube 210 in the folded position. Such a fastener may be attached to the removable upholstery 240, if desired.

When moving a carrier beam 236 from the folded position to an unfolded position, the carrier beam 236 may be rotated downward by approximately 90° from its stored position to its unfolded position around a carrier rotation axis, until the carrier beam 236 is approximately orthogonal relative to the tube 210. During the downward rotation of the carrier beam 236, a spring-loaded carrier locking device may glide on the carrier beam 236 and snap into a recess on the carrier beam 236 when the carrier beam 236 is fully unfolded.

When all carrier beams 236 are unfolded the net-type platform 230 may be able to stand safely on the ground. For example, the net-type platform 230 may stand on ground supports that are mounted on the lower side of each one of the carrier beams 236.

Illustratively, the net-type platform 230 may include nets 233 between the at least six carrier beams 236. When two neighboring carrier beams 236 are in the fully unfolded position, the net 233 may be stretched between the carrier beams 236.

Illustratively, several net holder bolts may fix a net 233 to a carrier beam 236. For this purpose, the net holder bolts may be passed through downwardly oriented loops that are installed at the middle plane of each carrier beam 236. The net holder bolts may be fed through drill holes on the outer flanges of the carrier beam 236 and secured with nuts.

On top of each carrier beam 236, a carrier cover may be attached. If desired, the carrier cover may be attached with a grip tape on its upper surface in order to guaranty a safe stand for the transport of people.

Thus, the modular load carrying apparatus 200 with the net-type platform 230 may be adapted for transporting a predetermined number of people and their equipment at the same time. As an example, the modular load carrying apparatus 200 with the net-type platform 230 may be adapted for transporting three people and equipment at the same time. As another example, the modular load carrying apparatus 200 with the net-type platform 230 may be adapted for transporting six people and equipment at the same time.

The net-type platform 230 may have a predetermined inner diameter that is greater than the predetermined outer diameter 215 of the tube 210. Thus, the net-type platform 230 may be adapted for being slidable over the first axial end 211 of the tube 210.

Illustratively, the modular load carrying apparatus 200 may include a removable cover 250. The removable cover 250 may be adapted for being slidable over the first axial end 211 of the tube 210. Thus, the removable cover 250 may have a predetermined inner diameter that is greater than the predetermined outer diameter 215 of the tube 210.

By way of example, the removable cover 250 may include a plurality of safety lugs 260. The plurality of safety lugs 260 may be adapted for receiving means that secure a load on the net-type platform 230. For example, a person sitting on a net 233 or standing on a carrier beam 236 may be attached to one or more of the safety lugs 260 by means of personal protective equipment.

As an example, a person sitting on a net 233 may be attached with a harness, a safety line, and a snap hook or spring hook to one of the safety lugs 260. If desired, additional safety lugs may be provided on the upholstery 240 to ensure a redundant securing of each person.

Illustratively, the removable cover 250 may be secured to the tube 210 and/or to the first cap. For example, cover fasteners 270 may be adapted for securing the removable cover 250 to the tube 210 and to the first cap.

If desired, the cover fasteners 270 may include safety bolts, quick release pins, or any other fasteners that may be removed and installed without a tool. Preferably, at least two cover fasteners 270 and not more than four cover fasteners secure the removable cover 250 to the tube 210 and to the first cap.

Figure 4A:
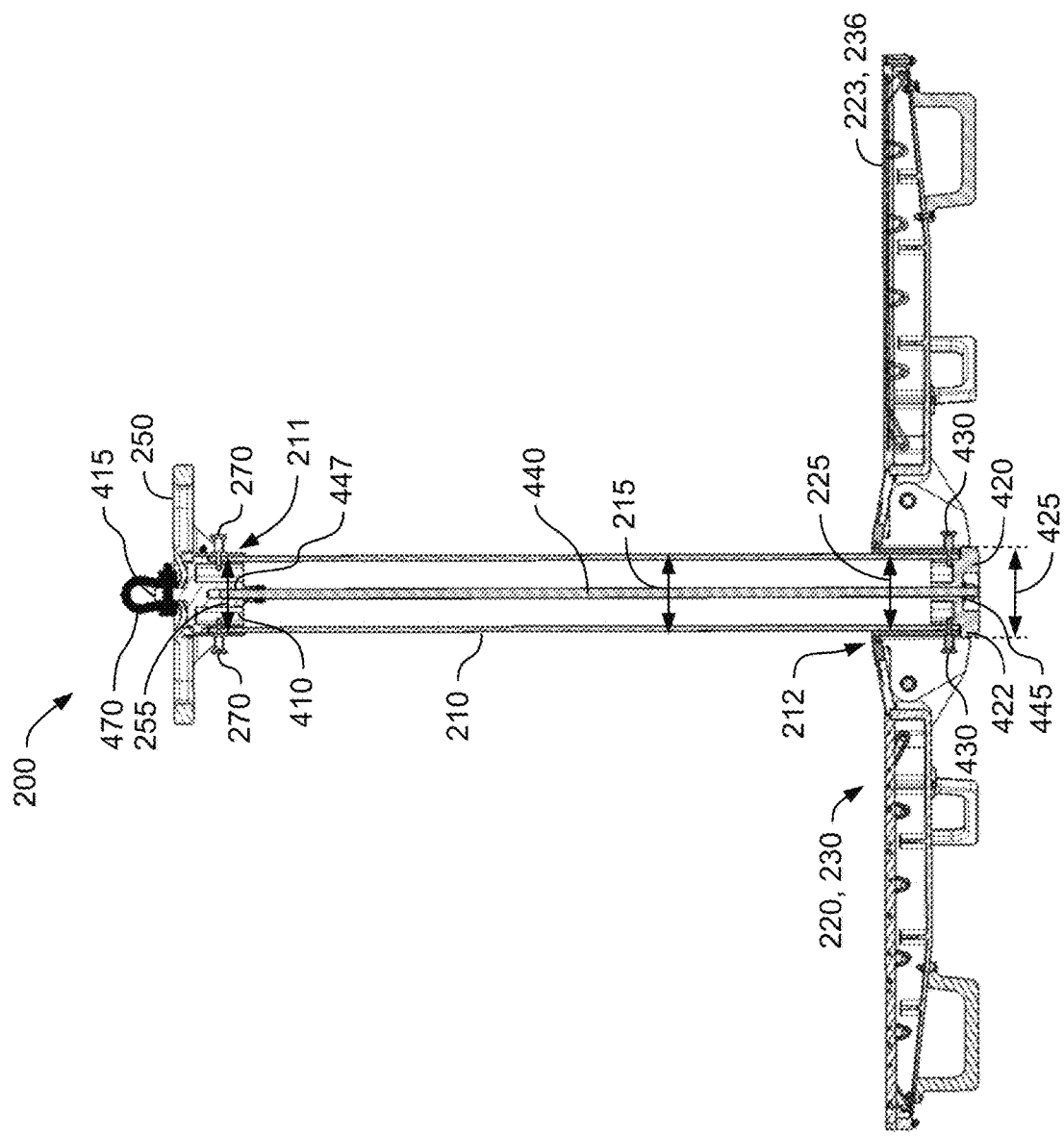
FIG. 4A is a cross sectional diagram of an illustrative modular load carrying apparatus in accordance with some embodiments.
Figure 4B:
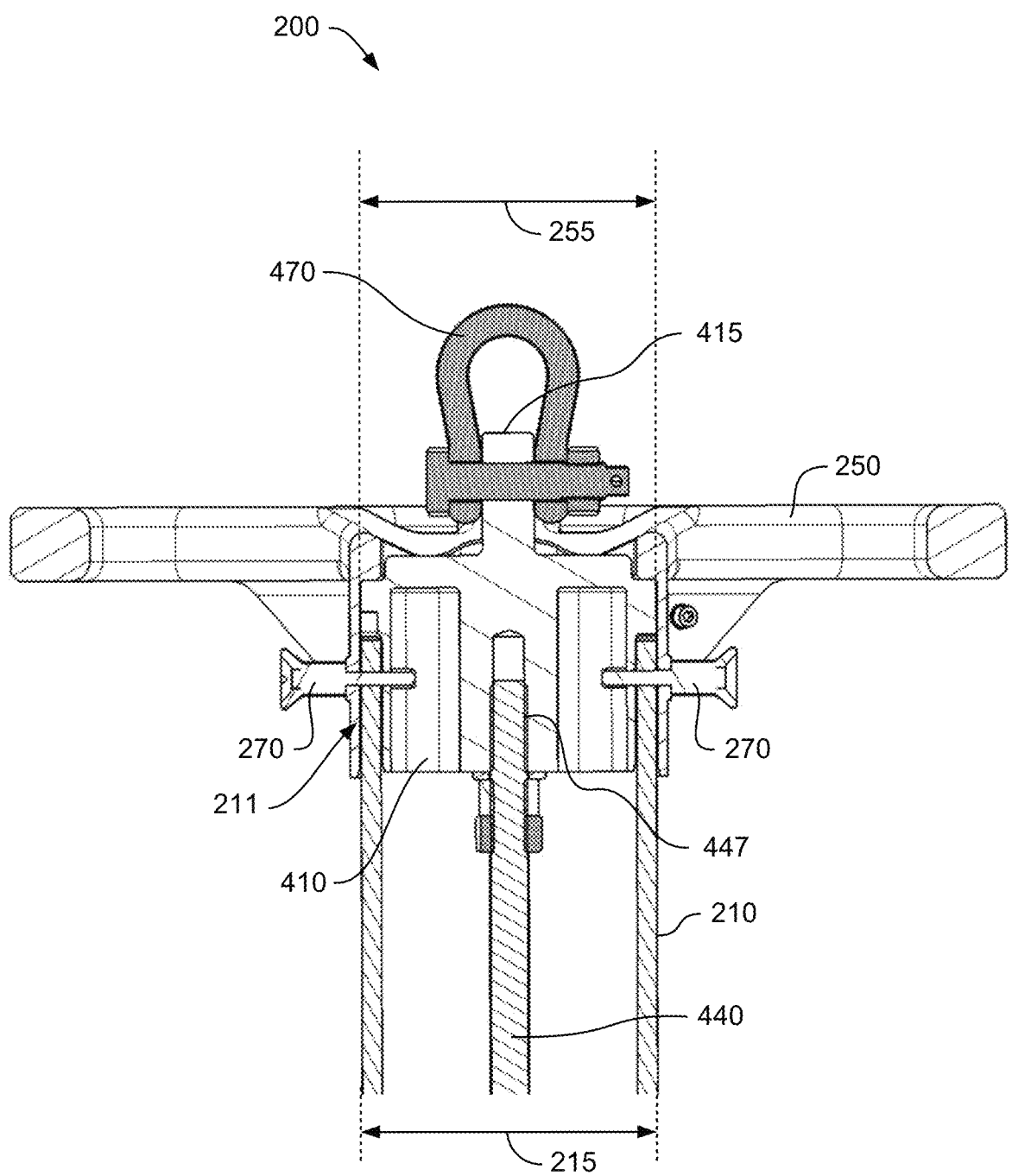
FIG. 4B is a cross sectional diagram of a first axial end of the illustrative modular load carrying apparatus of FIG. 4A in accordance with some embodiments.

FIG. 4A is a cross sectional diagram of an illustrative modular load carrying apparatus 200 for a rotary wing aircraft (e.g., rotary wing aircraft 100 of FIG. 1A or FIG. 1B). FIG. 4B is a cross sectional diagram of a first axial end 211 of the illustrative modular load carrying apparatus 200 of FIG. 4A, and FIG. 4C is a cross sectional diagram of a second axial end 212 of the illustrative modular load carrying apparatus 200 of FIG. 4A.

Illustratively, the modular load carrying apparatus 200 may include a tube 210. The tube 210 may have a first predetermined outer diameter 215 and first and second axial ends 211, 212. If desired, the tube 210 may be adapted for serving as a floatation device.

As shown in FIG. 4A and FIG. 4B, the modular load carrying apparatus 200 may include a first cap 410 that is located inside the tube 210 at the first axial end 211. The first cap 410 may be adapted for being connected with the rotary wing aircraft. For example, the first cap 410 may provide an eyelet 415, and a shackle 470 may attach the eyelet 415 with a cargo cable of the rotary wing aircraft.

Illustratively, the modular load carrying apparatus 200 may include a removable cover 250. The removable cover 250 may have a second predetermined inner diameter 255 that is greater than the first predetermined outer diameter 215. Thus, the removable cover 250 may be adapted for being slidable over the first axial end 211 of the tube 210.

If desired, cover fasteners 270 may be adapted for securing the removable cover 250 to the tube 210 and to the first cap 410. The cover fasteners 270 may include safety bolts, quick release pins, or any other fasteners that may be removed and installed without a tool. Preferably, the cover fasteners 270 may secure the removable cover 250 to the tube 210 and to the first cap 410 on opposite sides of the tube 210.

Figure 4C:
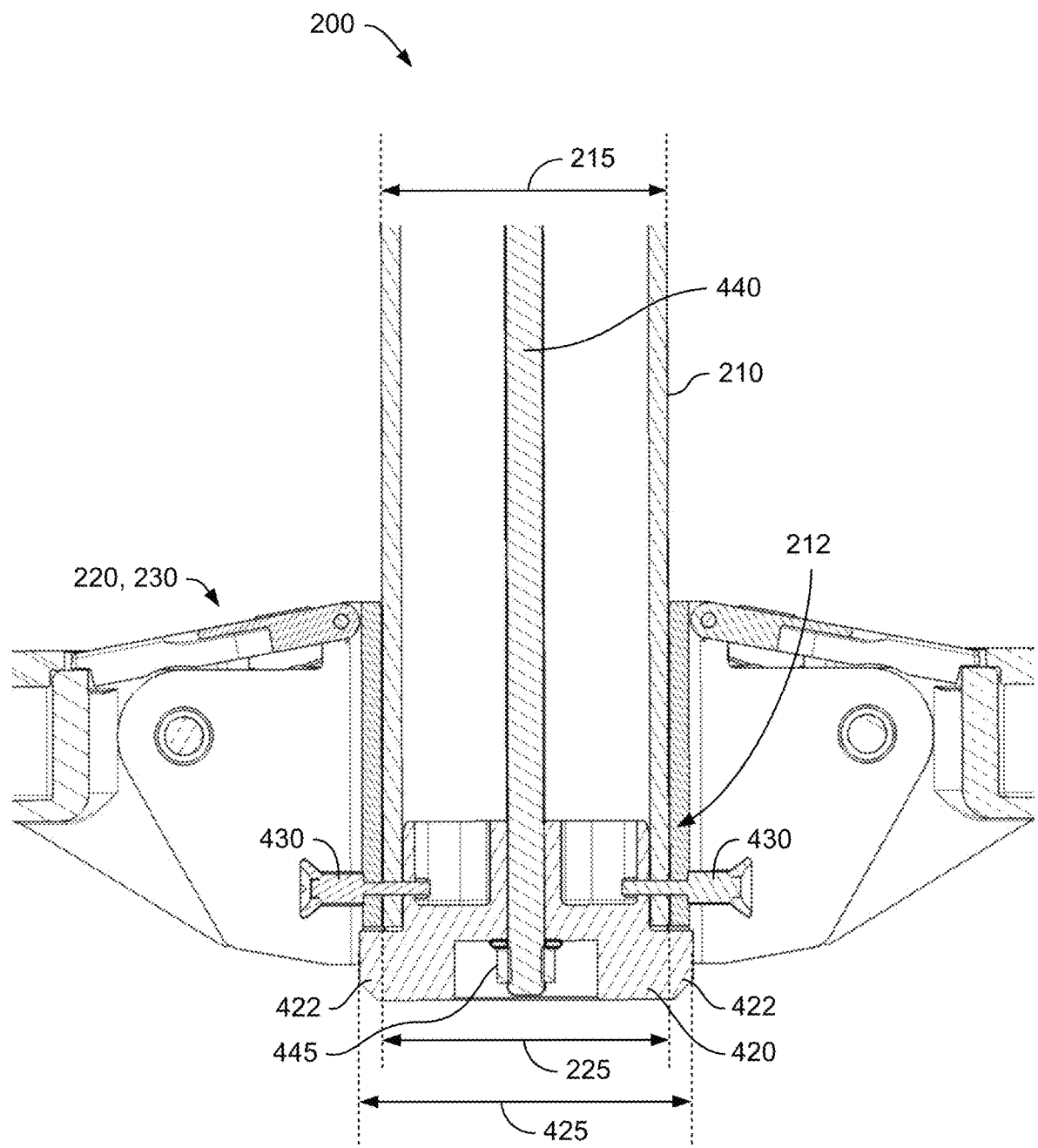
FIG. 4C is a cross sectional diagram of a second axial end of the illustrative modular load carrying apparatus of FIG. 4A in accordance with some embodiments.

As shown in FIG. 4A and FIG. 4C, the modular load carrying apparatus 200 may include a second cap 420. The second cap 420 may be located inside the tube 210 at the second axial end 212.

The second cap 420 may have a protrusion 422 that protrudes from the second axial end 212. The protrusion 422 may have a second predetermined outer diameter 425 that is greater than the first predetermined outer diameter 215 (i.e., the outer diameter of the tube 210).

Illustratively, the modular load carrying apparatus 200 may include at least first and second removable platforms 220, 230 that are interchangeably installable on the tube 210. For example, the modular load carrying apparatus 200 may include at least a removable seat-type platform 220 as shown in FIGS. 2A and 2B and a removable net-type platform 230 as shown in FIG. 3.

Each one of the at least first and second platforms 220, 230 may have a first predetermined inner diameter 225 that is greater than the first predetermined outer diameter 215 (i.e., the outer diameter of the tube 210) and smaller than the second predetermined outer diameter 425 (i.e., the outer diameter of the protrusion 422). Thus, each one of the at least first and second removable platforms 220, 230 is adapted for being slidable over the first axial end 211 of the tube 210 and restrained by the second axial end 212 of the tube 210.

Illustratively, the modular load carrying apparatus 200 may include platform fasteners 430. The platform fasteners 430 may be adapted for securing each one of the at least first and second removable platforms 220, 230 to the tube 210 and to the second cap 420.

The platform fasteners 430 may include safety bolts, quick release pins, or any other fasteners that may be removed and installed without a tool. Preferably, at least two platform fasteners 430 and not more than four platform fasteners 430 secure the removable platforms 220, 230 to the tube 210 and to the second cap 420.

Illustratively, the modular load carrying apparatus 200 may include a tension rod 440. The tension rod 440 may be spanned between the first cap 410 and the second cap 420. For example, the tension rod 440 may be arranged inside the tube 210 between the first and second caps 410, 420.

Illustratively, the tension rod 440 may be threaded at both ends. For example, the tension rod 440 may have outer threads at both ends. If desired, the first cap 410 may include a threaded hole 447 into which one threaded end of the tension rod 440 is screwed.

The second cap 420 may have a bore hole. The tension rod 440 may be put through the bore hole, and a tension rod fastener 445 such as a nut 445 may be screwed onto the other threaded end of the tension rod 440 (e.g., as shown in FIGS. 4A and 4C), thereby spanning the tension rod 440 between the first and second caps 410, 420 as shown in FIG. 4A.

Thus, the tube 210 is clamped between the first and second caps 410, 420 by means of the tension rod 440. The pretension of the tension rod 440 respectively the clamp force of the tube 210 may be adjusted by the tension rod fastener 445, if desired.

The tension rod 440 may transfer tension loads from the removable platform 220, 230 via the second cap 420 towards the first cap 410. The first cap 410 may further transfer the tension loads via the eyelet 415 to the shackle 470 and from there through a cargo cable (e.g., cargo cable 175 of FIG. 1A or 1B) to a hoist (e.g., hoist 170 of FIG. 1A) or cargo hook arrangement (e.g., cargo hook arrangement 180 of FIG. 1B).

Figure 5A:
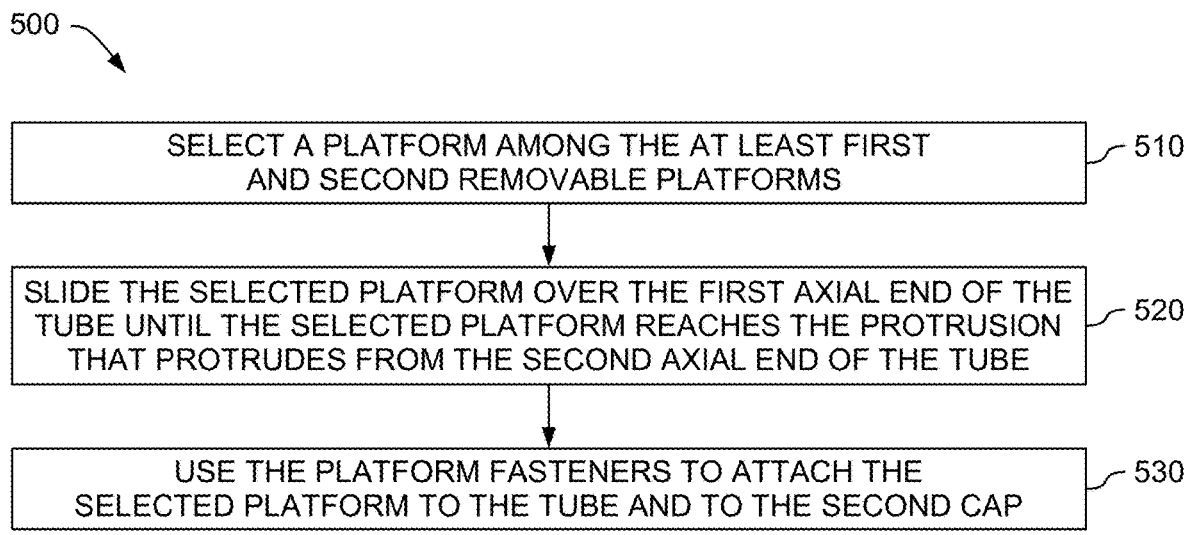
FIG. 5A is a flowchart showing illustrative operations of installing a removable platform on a modular load carrying apparatus in accordance with some embodiments.

FIG. 5A is a flowchart 500 showing illustrative operations of installing a removable platform such as the seat-type platform 220 of FIGS. 2A and 2B or the net-type platform 230 of FIG. 3 on a modular load carrying apparatus such as the modular load carrying apparatus 200 of FIGS. 2A to 4C.

As exemplarily shown in FIG. 4A, the modular load carrying apparatus 200 may include platform fasteners 430, a tube 210 that has a first predetermined outer diameter 215 and first and second axial ends 211, 212, a first cap 410 that is located inside the tube 210 at the first axial end 211, a second cap 420 that is located inside the tube 210 at the second axial end 212 and comprises a protrusion 422 that protrudes from the second axial end 212 and has a second predetermined outer diameter 425 that is greater than the first predetermined outer diameter 215, and at least first and second removable platforms 220, 230, wherein each one of the at least first and second platforms 220, 230 has a first predetermined inner diameter 225 that is greater than the first predetermined outer diameter 215 and smaller than the second predetermined outer diameter 425.

During operations 510, 520, and 530, an operator may select a platform among the at least first and second removable platforms, slide the selected platform over the first axial end of the tube until the selected platform reaches the protrusion that protrudes from the second axial end of the tube, and use the platform fasteners to attach the selected platform to the tube and to the second cap.

For example, an operator may select a platform 220, 230 among the at least first and second removable platforms 220, 230 (e.g., the seat-type platform 220 of FIG. 2A and the net-type platform 230 of FIG. 3) of FIG. 4A, slide the selected platform 220, 230 over the first axial end 211 of the tube 210 until the selected platform 220, 230 reaches the protrusion 422 that protrudes from the second axial end 212 of the tube 210, and use the platform fasteners 430 to attach the selected platform 220, 230 to the tube 210 and to the second cap 420.

If desired, the modular load carrying apparatus 200 of FIG. 4A may include removable upholstery (e.g., removable upholstery 240 of FIG. 2A). During an additional operation, the removable upholstery may be slid over the first axial end of the tube until the removable upholstery reaches the selected platform such that the removable upholstery covers the outside of the tube.

For example, the removable upholstery 240 of FIG. 2A may be slid over the first axial end 211 of the tube 210 until the removable upholstery 240 reaches the selected platform 220, 230 such that the removable upholstery 240 covers the outside of the tube 210.

Illustratively, the modular load carrying apparatus 200 of FIG. 4A may further include cover fasteners 270 and a removable cover 250 that has a second predetermined inner diameter 255 that is greater than the first predetermined outer diameter 215. During an additional operation, the removable cover may be installed at the first axial end of the tube, and the cover fasteners may be used to attach the removable cover to the tube and to the first cap.

For example, the removable cover 250 of FIG. 4A may be installed at the first axial end 211 of the tube 210, and the cover fasteners 270 may be used to attach the removable cover 250 to the tube 210 and to the first cap 410.

Figure 5B:
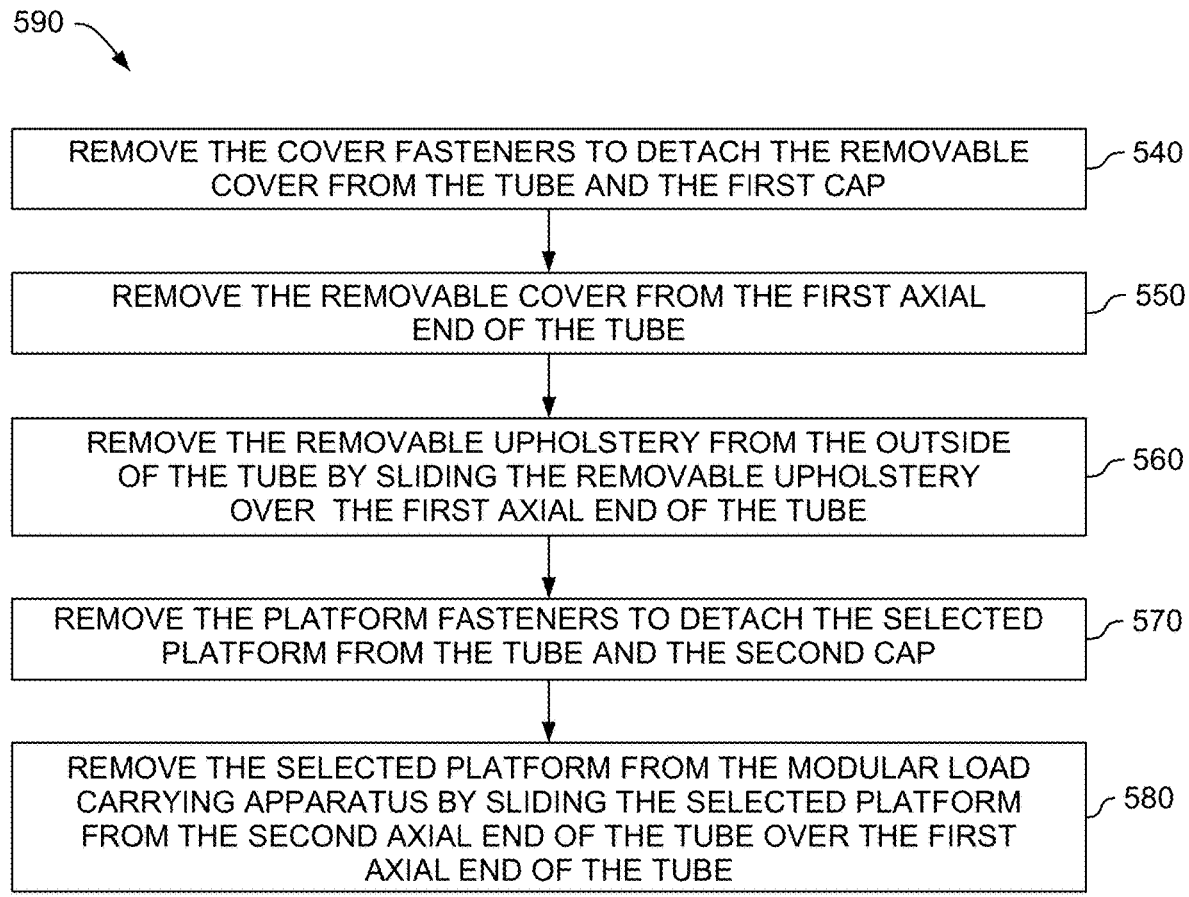
FIG. 5B is a flowchart showing illustrative operations of removing a removable platform from a modular load carrying apparatus in accordance with some embodiments.

FIG. 5B is a flowchart 590 showing illustrative operations of removing a removable platform such as the seat-type platform 220 of FIGS. 2A and 2B or the net-type platform 230 of FIG. 3 from the modular load carrying apparatus 200 described with reference to FIG. 5A.

During operations 540 and 550, an operator may remove the cover fasteners to detach the removable cover from the tube and the first cap. The operator may then remove the removable cover from the first axial end of the tube.

For example, an operator may remove the cover fasteners 270 of FIG. 4A to detach the removable cover 250 from the tube 210 and the first cap 410, and remove the removable cover 250 from the first axial end 211 of the tube 210.

During operation 560, the operator may remove the removable upholstery from the outside of the tube by sliding the removable upholstery over the first axial end of the tube.

For example, the operator may remove the removable upholstery 240 of FIG. 2A from the outside of the tube 210 by sliding the removable upholstery 240 over the first axial end 211 of the tube 210.

During operation 570, the operator may remove the platform fasteners to detach the selected platform from the tube and the second cap, and, during operation 580, remove the selected platform from the modular load carrying apparatus by sliding the selected platform from the second axial end of the tube over the first axial end of the tube.

For example, the operator may remove the platform fasteners 430 of FIG. 4A to detach the selected platform 220, 230 from the tube 210 and the second cap 310, and remove the selected platform 220, 230 from the modular load carrying apparatus 200 by sliding the selected platform 220, 230 from the second axial end 212 of the tube 210 over the first axial end 211 of the tube 210.

It should be noted that the above-described embodiments are merely described for illustration purposes, but not in order to restrict the present disclosure thereto. Instead, multiple modifications and variations of the presented embodiments are possible and should, therefore, also be considered as being part of the disclosure.

For example, hoist 170 of FIG. 1A and cargo hook arrangement 180 of FIG. 1B are shown to include a winch and the first end 176 of cargo cable 175 may be attachable to the winch. However, the winch may be part of the load carrying assembly 190 instead, and hoist 170 as well as cargo hook arrangement 180 may be adapted to receive the winch.

REFERENCE LIST 100 rotary wing aircraft
110 multi-blade main rotor
111, 112 rotor blades
113 rotor head
115 landing gear
116 motor
120 fuselage
121 fuselage underside
130 nose region
131 tail boom
140 component
150 power transmission system
160 equipment
170 hoist
175 cargo cable
176 first end of cargo cable
177 second end of cargo cable
180 cargo hook arrangement
190 load carrying assembly
200 modular load carrying apparatus
210 tube
211, 212 axial end
215 outer diameter
220 removable platform
223 seat
225 inner diameter
230 removable platform
233 net
236 carrier beam
240 removable upholstery
250 removable cover
255 inner diameter
260 safety lug
270 cover fastener
410 cap
415 eyelet
420 cap
422 protrusion
425 outer diameter
430 platform fastener
440 tension rod
445 tension rod fastener
447 threaded hole
470 shackle
500, 590 method
510, 520, 530, 540, 550, 560, 570, 580 operation

What is claimed is:

1. A modular load carrying apparatus for a rotary wing aircraft, comprising:
    a tube that has a first predetermined outer diameter and first and second axial ends;
    a first cap that is located inside the tube at the first axial end and adapted for being connected with the rotary wing aircraft;
    a second cap that is located inside the tube at the second axial end and comprises a protrusion that protrudes from the second axial end and has a second predetermined outer diameter that is greater than the first predetermined outer diameter; and
    at least first and second removable platforms that are interchangeably installable on the tube, wherein each one of the at least first and second platforms has a first predetermined inner diameter that is greater than the first predetermined outer diameter and smaller than the second predetermined outer diameter such that each one of the at least first and second removable platforms is adapted for being slidable over the first axial end of the tube and restrained by the second axial end of the tube.

2. The modular load carrying apparatus of claim 1 wherein only one of the at least first and second removable platforms is installable on the tube at a given time.

3. The modular load carrying apparatus of claim 1 wherein the at least first and second removable platforms further comprise:
   a seat-type platform with at least three seats.

4. The modular load carrying apparatus of claim 1 wherein the at least first and second removable platforms further comprise:
   a net-type platform with at least six carrier beams and nets between the at least six carrier beams.

5. The modular load carrying apparatus of claim 1 further comprising:
   removable upholstery that is removably installed to cover the outside of the tube.

6. The modular load carrying apparatus of claim 1 further comprising:
   platform fasteners that are adapted for securing each one of the at least first and second removable platforms to the tube and to the second cap.

7. The modular load carrying apparatus of claim 1 further comprising:
   a removable cover that has a second predetermined inner diameter that is greater than the first predetermined outer diameter and that is adapted for being slidable over the first axial end of the tube.

8. The modular load carrying apparatus of claim 7 wherein the removable cover further comprises:
   a plurality of safety lugs that are adapted for receiving means that secure a load on the at least first and second removable platforms.

9. The modular load carrying apparatus of claim 7 further comprising:
   cover fasteners that are adapted for securing the removable cover to the tube and to the first cap.

10. A method of operating a modular load carrying apparatus, the modular load carrying apparatus comprising platform fasteners, a tube that has a first predetermined outer diameter and first and second axial ends, a first cap that is located inside the tube at the first axial end, a second cap that is located inside the tube at the second axial end and comprises a protrusion that protrudes from the second axial end and has a second predetermined outer diameter that is greater than the first predetermined outer diameter, and at least first and second removable platforms, wherein each one of the at least first and second platforms has a first predetermined inner diameter that is greater than the first predetermined outer diameter and smaller the second predetermined outer diameter, the method comprising:
    selecting a platform among the at least first and second removable platforms;
    sliding the selected platform over the first axial end of the tube until the selected platform reaches the protrusion that protrudes from the second axial end of the tube; and
    using the platform fasteners to attach the selected platform to the tube and to the second cap.

11. The method of claim 10 wherein the modular load carrying apparatus further comprises removable upholstery, further comprising:
    sliding the removable upholstery over the first axial end of the tube until the removable upholstery reaches the selected platform such that the removable upholstery covers the outside of the tube.

12. The method of claim 10 wherein the modular load carrying apparatus further comprises cover fasteners and a removable cover that has a second predetermined inner diameter that is greater than the first predetermined outer diameter, further comprising:
    installing the removable cover at the first axial end of the tube; and
    using the cover fasteners to attach the removable cover to the tube and to the first cap.

13. The method of claim 12 further comprising:
    removing the cover fasteners to detach the removable cover from the tube and the first cap; and
    removing the removable cover from the first axial end of the tube.

14. The method of claim 10 wherein the modular load carrying apparatus comprises removable upholstery that covers the outside of the tube, further comprising:
    removing the removable upholstery from the outside of the tube by sliding the removable upholstery over the first axial end of the tube.

15. The comprising:
    method of claim 10 further removing the platform fasteners to detach the selected platform from the tube and the second cap; and
    removing the selected platform from the modular load carrying apparatus by sliding the selected platform from the second axial end of the tube over the first axial end of the tube.

16. A modular load carrying apparatus for a rotary wing aircraft, comprising:
    a tube that has a first predetermined outer diameter and first and second axial ends;
    removable upholstery that is removably installed to cover the outside of the tube;
    a first cap that is located inside the tube at the first axial end and adapted for being connected with the rotary wing aircraft;
    a second cap that is located inside the tube at the second axial end and comprises a protrusion that protrudes from the second axial end and has a second predetermined outer diameter that is greater than the first predetermined outer diameter;
    at least first and second removable platforms that are interchangeably installable on the tube, wherein each one of the at least first and second platforms has a first predetermined inner diameter that is greater than the first predetermined outer diameter and smaller than the second predetermined outer diameter such that each one of the at least first and second removable platforms is adapted for being slidable over the first axial end of the tube and restrained by the second axial end of the tube; and
    platform fasteners that are adapted for securing each one of the at least first and second removable platforms to the tube and to the second cap.

17. The modular load carrying apparatus of claim 16 wherein only one of the at least first and second removable platforms is installable on the tube at a given time.

18. The modular load carrying apparatus of claim 16 wherein the at least first and second removable platforms further comprise:
    a seat-type platform with at least three seats.

19. The modular load carrying apparatus of claim 16 wherein the at least first and second removable platforms further comprise:

a net-type platform with at least six carrier beams and nets between the at least six carrier beams.

20. The modular load carrying apparatus of claim 16 further comprising:
a removable cover that has a second predetermined inner diameter that is greater than the first predetermined outer diameter and that is adapted for being slidable over the first axial end of the tube.

* * * * *